UNITED STATES PATENT OFFICE.

JOANNES COENRADUS HUBERTUS KRAMERS, OF NIJMEGEN, NETHERLANDS.

PROCESS FOR THE ABSORPTION OF CARBON DIOXID FROM GASEOUS MIXTURES.

1,290,244.  Specification of Letters Patent.  Patented Jan. 7, 1919.

No Drawing.  Application filed January 12, 1916.  Serial No. 71,716.

*To all whom it may concern:*

Be it known that I, Dr. JOANNES COENRADUS HUBERTUS KRAMERS, professor, residing at Nijmegen, the Netherlands, a subject of the Queen of the Netherlands, have invented certain new and useful Improvements in Processes for the Absorption of Carbon Dioxid from Gaseous Mixtures, of which the following is a specification.

Gaseous mixtures which contain inert gases and $CO_2$ can be freed from the latter by washing with alkaline liquids.

For this purpose solutions of KOH, NaOH, $Ca(OH)_2$, $Ba(OH)_2$, sodium- and potassium carbonates are especially suitable for the purpose. During the absorption of $CO_2$ the hydroxids are converted into carbonates and by an excess of $CO_2$ partly even into bicarbonates. The use of carbonate solutions depends on the ability thereof to form bicarbonates. This reaction under conditions, is far from complete, the absorption of $CO_2$ in carbonate solutions from gaseous mixtures, in which the partial pressure of this gas is small, stopping a considerable time before all the carbonate has been converted into bicarbonate. This is caused by the fact that the ion $HCO_3$ of the hydrocarbonates (bicarbonates) is easily converted by hydrolysis into $H_2O$ and $CO_2$ so that the dissociation pressure of the $CO_2$ in the solution soon equals the partial pressure of that gas in the gaseous mixture as shown in the following equation:

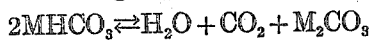
$$2MHCO_3 \rightleftarrows H_2O + CO_2 + M_2CO_3$$

In addition to the above, an absorbent solution containing a given amount of alkali metal, existing initially in the form of carbonate absorbs theoretically, only one-half as much $CO_2$ as would be absorbed by an absorbent solution containing the same amount of alkali metal, initially existing in the form of hydroxid. It is apparent from the above-mentioned facts, that in practice the quantity of $CO_2$ absorbed is even less. Notwithstanding these drawbacks the carbonates, especially a solution of potash, are mostly used in practice for reasons of economy.

The hydroxids which as to the quickness of absorption and the quantity of $CO_2$ absorbed far surpass the carbonates, cannot be regenerated in a simple way. The regeneration of a solution of bicarbonate by boiling does not proceed farther than the formation of the normal carbonates. The carbonates on the other hand, though being, as stated before, in point of absorption far inferior to the hydroxids, can, after being converted into bicarbonates, be regenerated by simply boiling and this is the reason of their being used in practice, notwithstanding their drawbacks.

Besides the above mentioned compounds MgO might be used for the purpose, which by water is converted into $Mg(OH)_2$.

The solubility of the latter compound being however, small, the absorption of $CO_2$ proceeds very slowly, while even by thorough shaking or stirring the result is not perceptibly improved.

$MgCO_3$ in suspension in water also absorbs $CO_2$ whereby bicarbonate of magnesia is formed, but this absorption, which of course, as far as the quantity of $CO_2$ absorbed is concerned is far below that possible by the use of MgO. This action also proceeds very slowly. Even more unsatisfactory, are the results when using a suspension of magnesia alba, (basic magnesium carbonate of commerce) in water.

Now the present invention relates to a process for the absorption of $CO_2$ from gaseous mixtures, by an absorbent, which unites the advantages of the alkaline hydroxids (high power absorption) with those of the alkali carbonates (being regenerable).

The invention is founded on the observation that a large volume of $CO_2$ is absorbed within a short time, if an absorbent is used which consists of a solution of a normal alkali carbonate, in which a basic magnesium compound, is suspended. Examples are magnesium hydroxyde, or a highly basic magnesium carbonate, or a mixture of these compounds. The saturation of the magnesium compound with $CO_2$, by which it is partly converted into carbonate and partly into bicarbonate, proceeds very quickly and at ordinary atmospheric temperature the $CO_2$ remains firmly combined with the magnesia.

Of course, as is well known, the alkali carbonate present also absorbs $CO_2$ at ordinary temperature and is partly converted thereby into bicarbonate. It is not improbable that this formation of bicarbonate is the real cause of the fact that the $CO_2$ is so easily taken up by the magnesium compound, because in the absence of an alkali carbonate the absorption proceeds very slowly. This suspension of magnesium compound in alkali solution, employed as an absorbent, acts nearly as well as the hydroxids, and it can be completely regenerated as easily as can the carbonates by very simple means, viz. by boiling.

By boiling the alkali bicarbonate is converted into normal carbonate and the hydroxyl-ions, which are then present in the solution, then convert the magnesium carbonate into the original highly basic carbonate or a compound very nearly related thereto, perhaps partially into hydroxid. If magnesium bicarbonate has been formed during the absorption of $CO_2$ it is of course first converted into the normal carbonate by boiling. After boiling the liquid has the same, or nearly the same constitution as before the absorption and after cooling it can be used again to absorb $CO_2$. If the gas to be treated is hot, it should be cooled down before the absorption, because at high temperatures the absorption would of course proceed much less satisfactorily or even not at all. In that case the heat of the gas may be used advantageously to regenerate the absorbent already used, which regeneration may be executed in known heat-exchange apparatus which may operate on the counter-current principle.

The regeneration is promoted, if the liquid has a boiling-point above that of pure water, this facilitating the expelling of the $CO_2$ during the boiling operation. By the alkali carbonate present the boiling-point of the solution is raised to a certain extent; if desirable it may be raised still more by adding salts, for example common salt, potassium chlorid, sodium-, or potassium nitrate, &c., which react neither with the absorbing alkali nor with the magnesium compounds, nor in any other way disadvantageously influence the absorption.

To get a proper absorbent, magnesia alba may be added to a solution of an alkali-carbonate and the obtained mixture may be boiled. The magnesium compound is converted by the action of the hydroxyl-ions of the alkaline solution into carbonates of higher basicity, partly perhaps into hydroxid.

The desired magnesium compounds can be obtained also by precipitation in the liquid. If one wishes to raise the boiling-point of the liquid by addition of a salt, the latter may be added at the same time.

*Example 1.*

20 parts by weight of magnesia alba are boiled in 200 parts of water free from lime, to which water 10 parts of sodium- or potassium carbonate, as well as 1 to 15 parts of sodium- or potassium nitrate, are added. After having boiled for some time, and being cooled down afterward, the liquid is ready for use and is used for the absorption of $CO_2$ from gaseous mixtures like absorbents of the usual kind.

*Example 2.*

20 parts by weight of magnesium chlorid are dissolved in water and while continuously stirring the solution is mixed with a concentrated solution of sodium carbonate, in such proportion that twice as much sodium carbonate is used, as would be required for the reaction $2Na_2CO_3 + 2MgCl_2 + H_2O =$
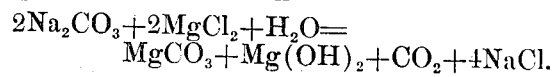
$MgCO_3 + Mg(OH)_2 + CO_2 + 4NaCl.$ After boiling and cooling the liquid is ready for use and is used for the absorption of $CO_2$.

*Example 3.*

The precipitate obtained according to Example 2 is purified by decantation and is then boiled in a concentrated solution of sodium- or potassium carbonate and after that the liquid is cooled down and used as an absorbent for $CO_2$.

*Example 4.*

A liquid, obtained according to one of the foregoing examples which has already served for the absorption of $CO_2$, is conducted through a heat exchange apparatus, in which it is indirectly heated in counter-current by a counter-current of a heating agent, for example, by the hot gases, from which the $CO_2$ is subsequently to be absorbed. By this heating the $CO_2$ is expelled and after being cooled down, the liquid is used again for the absorption of $CO_2$ from gaseous mixtures.

Having now described my invention, what I claim as new and desire to secure by Letters Patent is:—

1. A process of absorbing carbon dioxid from a gas mixture containing the same, which comprises bringing the gas mixture into contact with a liquid absorbent carrying in solution, an alkali metal carbonate, and a sludge of a magnesium compound capable of uniting with carbon dioxid.

2. A process of absorbing carbon dioxid from a gas mixture containing the same, which comprises bringing the said gas mixture into contact with an absorbent comprising a solution of an alkali metal carbonate containing magnesium compounds including magnesium hydroxid.

3. A process of absorbing carbon dioxid from a gas mixture containing the same which comprises bringing the said gas mixture into contact with an absorbent menstruum containing magnesium compounds and alkali metal compounds, said compounds being capable of combining with $CO_2$ to form bicarbonates.

4. A process of absorbing carbon dioxid from a gas mixture containing the same which comprises bringing said gas mixture into contact with a liquid absorbent carrying in solution alkali metal carbonate and carrying a sludge of a magnesium compound capable of uniting with carbon dioxid, at a relatively low temperature, and thereafter heating the said absorbent liquid to approximately its boiling point to drive off absorbed carbon dioxid and to regenerate said absorbent.

5. A process of absorbing carbon dioxid from gas mixtures containing the same which comprises subjecting said gas mixtures to the action of an absorbent medium comprising a solution containing alkali metal carbonate and containing a considerable quantity of other soluble salts, capable of raising the boiling point, and also containing precipitated magnesium.

6. In the absorption of carbon dioxid from gas mixtures containing the same, the step of boiling a solution containing alkali metal bicarbonate and magnesium bicarbonate, to produce a solution containing alkali metal carbonate and magnesium basic carbonate, which solution is capable of again being used for absorbing carbon dioxid.

7. In the absorption of carbon dioxid from gaseous mixtures, the herein described step which comprises producing a suspension of basic magnesium carbonate in a solution containing alkali metal carbonate, suitable for use as an absorbent medium.

In testimony whereof I affix my signature in presence of two witnesses.

Dr. JOANNES COENRADUS HUBERTUS KRAMERS.

Witnesses:
  Dr. Tony Jurgens,
  H. Y. Koort.